United States Patent
Lake et al.

(10) Patent No.: US 7,366,872 B2
(45) Date of Patent: Apr. 29, 2008

(54) METHOD FOR ADDRESSING CONFIGURATION REGISTERS BY SCANNING FOR A STRUCTURE IN CONFIGURATION SPACE AND ADDING A KNOWN OFFSET

(75) Inventors: Christopher J. Lake, Folsom, CA (US); Michael C. Wu, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 10/750,057

(22) Filed: Dec. 30, 2003

(65) Prior Publication Data

US 2005/0149636 A1 Jul. 7, 2005

(51) Int. Cl.
*G06F 12/00* (2006.01)
(52) U.S. Cl. .................. 711/220; 711/100; 711/219; 711/220; 710/1; 710/3; 710/36; 710/52; 710/100; 710/305; 710/310; 710/313; 710/314; 710/315
(58) Field of Classification Search ............... 711/100, 711/220, 219; 710/1, 3, 36, 52, 100, 305, 710/310, 313, 314, 315
See application file for complete search history.

(56) References Cited

U.S. PATENT DOCUMENTS

| | | | |
|---|---|---|---|
| 5,574,869 A | | 11/1996 | Young |
| 5,590,374 A | * | 12/1996 | Shariff et al. .................. 710/9 |
| 5,623,697 A | * | 4/1997 | Bland et al. .................. 710/22 |
| 5,909,557 A | * | 6/1999 | Betker et al. ............... 710/104 |
| 6,018,810 A | * | 1/2000 | Olarig ......................... 714/43 |
| 6,078,402 A | * | 6/2000 | Fischer et al. ............. 358/1.16 |
| 6,185,630 B1 | * | 2/2001 | Simmons .................... 710/10 |
| 6,241,400 B1 | * | 6/2001 | Melo et al. ................ 710/313 |
| 6,587,868 B2 | * | 7/2003 | Porterfield .................. 709/203 |
| 6,697,885 B1 | * | 2/2004 | Goodfellow ................ 710/22 |
| 6,804,673 B2 | * | 10/2004 | Sugahara et al. ............ 707/10 |
| 6,820,149 B2 | * | 11/2004 | Moy .......................... 710/104 |
| 6,880,033 B1 | * | 4/2005 | Mahmoud et al. .......... 710/305 |
| 6,973,526 B2 | * | 12/2005 | Lee et al. .................... 710/305 |
| 2003/0188122 A1 | * | 10/2003 | Bennett et al. ............. 711/202 |

* cited by examiner

*Primary Examiner*—Sanjiv Shah
*Assistant Examiner*—Zhuo H Li
(74) *Attorney, Agent, or Firm*—Blakely, Sokoloff, Taylor & Zafman LLP

(57) ABSTRACT

A configuration memory space is scanned to locate an identification register whose value matches a predetermined value. The identification register identifies the location of a structure within the configuration space. The location of the beginning of the structure is used along with a predetermined (known) offset to determine the address of a desired configuration register.

32 Claims, 5 Drawing Sheets

METHOD FOR ADDRESSING CONFIGURATION REGISTERS BY SCANNING FOR A STRUCTURE IN CONFIGURATION SPACE AND ADDING A KNOWN OFFSET

FIELD OF THE INVENTION

The present invention pertains to the field of computer systems. More particularly, this invention pertains to the field addressing configuration registers.

BACKGROUND OF THE INVENTION

One difficulty encountered by today's computer system software programmers is that of needing to modify configuration software whenever computer hardware component designers change the address location of structures within computer system devices. This situation commonly occurs when hardware component designers create new versions of computer system devices. Some of the changes may occur due to the inclusion of new technologies within the computer system.

One example of the difficulties encountered by software programmers in keeping up with the changes made by hardware designers is in the area of relocating structures within a device's configuration space. Currently, when a hardware designer moves a structure within the configuration space of a device, basic input/output system (BIOS) software engineers must modify the equates specifying the offset of a register to match the new configuration space map.

One of the more major computer system component interconnect technologies over the last decade has been the Peripheral Component Interconnect (PCI). A newer interconnect technology that is beginning to emerge and is expected to gain wide acceptance is PCI Express. Both the PCI and the PCI Express specifications (PCI Local Bus Specification, revision 2.3; PCI Express Base Specification, revision 1.0a) allow hardware designers to move pre-defined structures to different locations within the configuration space of a device.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, in order to access a register within a configuration space, the address space is scanned to locate an identification register whose value matches a predetermined value. The identification register identifies the location of a structure within the address space. The location of the beginning of the structure is used along with a predetermined (known) offset to determine the address of the desired register.

The PCI and PCI Express specifications provide that the offset of registers within a structure cannot be moved. Therefore, the above mentioned embodiment for accessing a register within a configuration space will locate the desired register even if in the future the structure is moved. The same would hold for any hardware specification that allows for the movement of structures within a device but provides that the offsets of registers within the structures not be changed.

Figure 1:
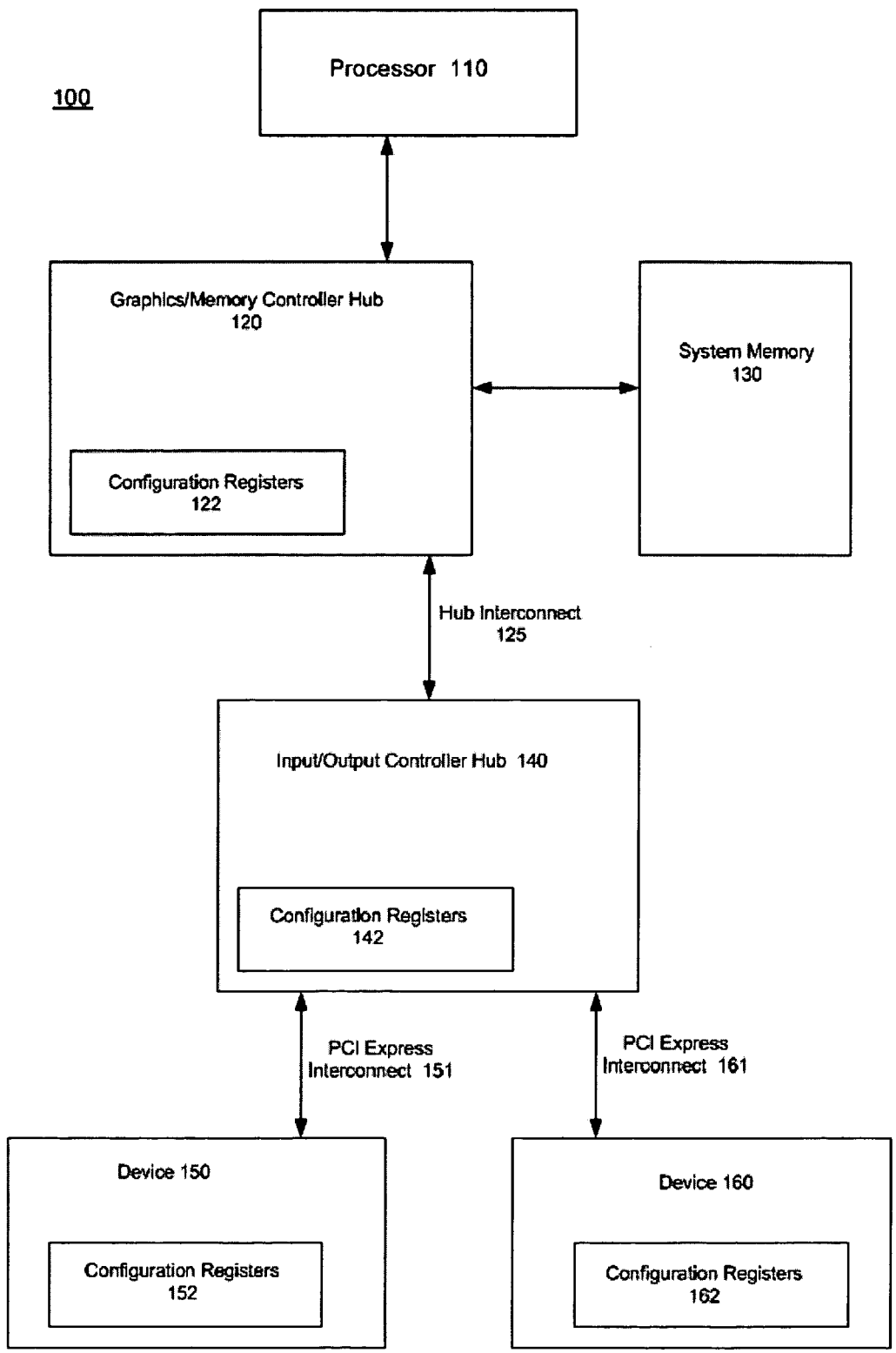
FIG. 1 is a block diagram of a computer system including various components that have configuration registers.

FIG. 1 is a block diagram of an example computer system 100. The system 100 includes a processor 110 coupled to a graphics/memory controller hub 120. The graphics/memory controller hub 120 provides communication with a system memory 130 and also includes a graphics controller (not shown). The graphics/memory controller hub 120 is coupled via a hub interconnect 125 to an input/output controller hub 140. The input/output controller hub 140 is coupled to a device 150 via a PCI Express Interconnect 151 and is also coupled to a device 160 via a PCI Express Interconnect 161. The input/output controller hub 140 acts as a PCI Express switching device.

The graphics/memory controller hub 120 includes configuration registers 122. The input/output controller hub 140 includes configuration registers 142. The device 150 includes configuration registers 152 and the device 160 includes configuration registers 162.

The above example computer system 100 is only one of a wide range of possible computer system configurations, and is provided to show that many devices in a computer system include registers that are accessed through configuration space.

Figure 2:
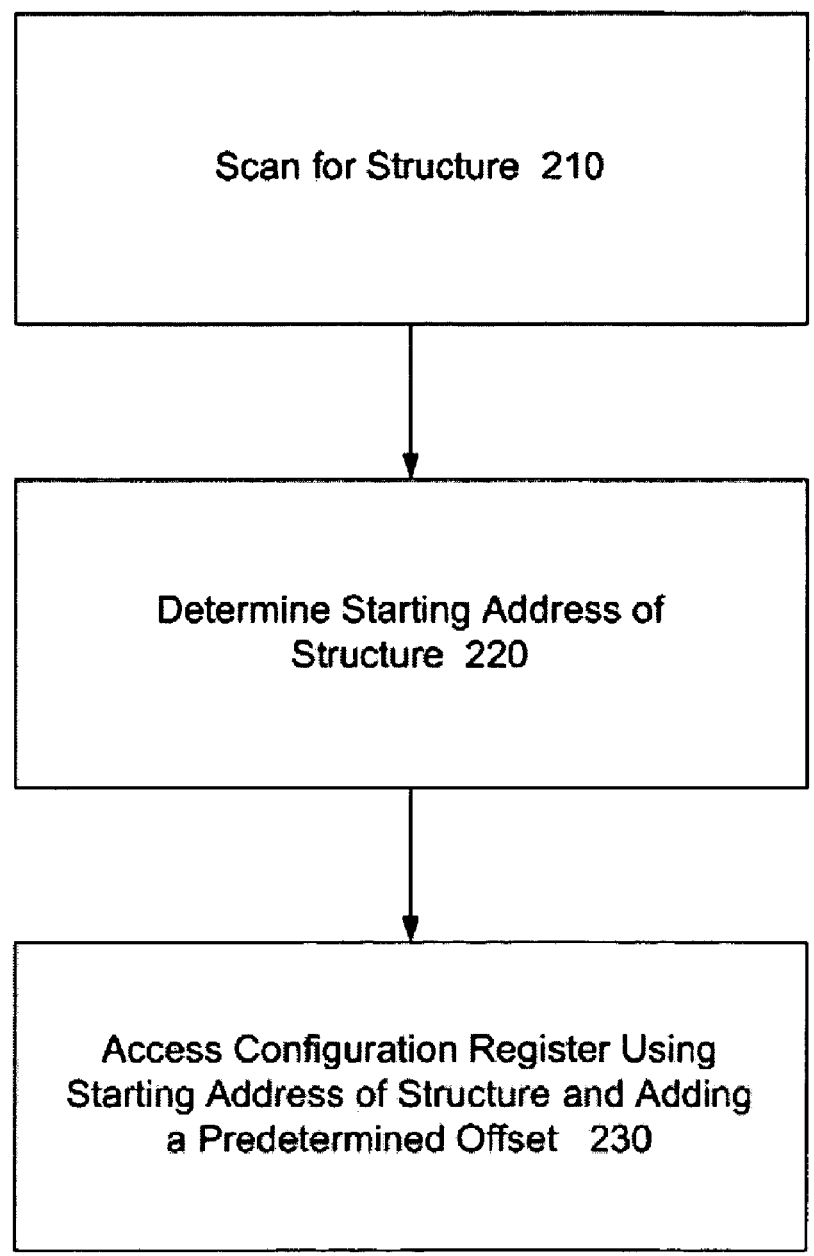
FIG. 2 is a flow diagram of one embodiment of a method for accessing configuration registers in a device where the embodiment is immune to the relocation of the configuration registers in future revisions of the device.

FIG. 2 is a flow diagram of one embodiment of a method for accessing configuration registers in a device. The embodiment is immune to the relocation of the configuration registers in future revisions of the device. The process starts at block 210 where a scan is performed of a space in order to locate a structure within a device. For this example, the space is a configuration memory space, although other embodiments are possible with other types of memory or input/output spaces.

Once the desired structure is located, its starting address is determined at block 220. At block 230, a memory location is accessed using the starting address of the structure and adding a known offset. The memory location in this example is a configuration register within the structure in configuration memory space.

Figure 3:
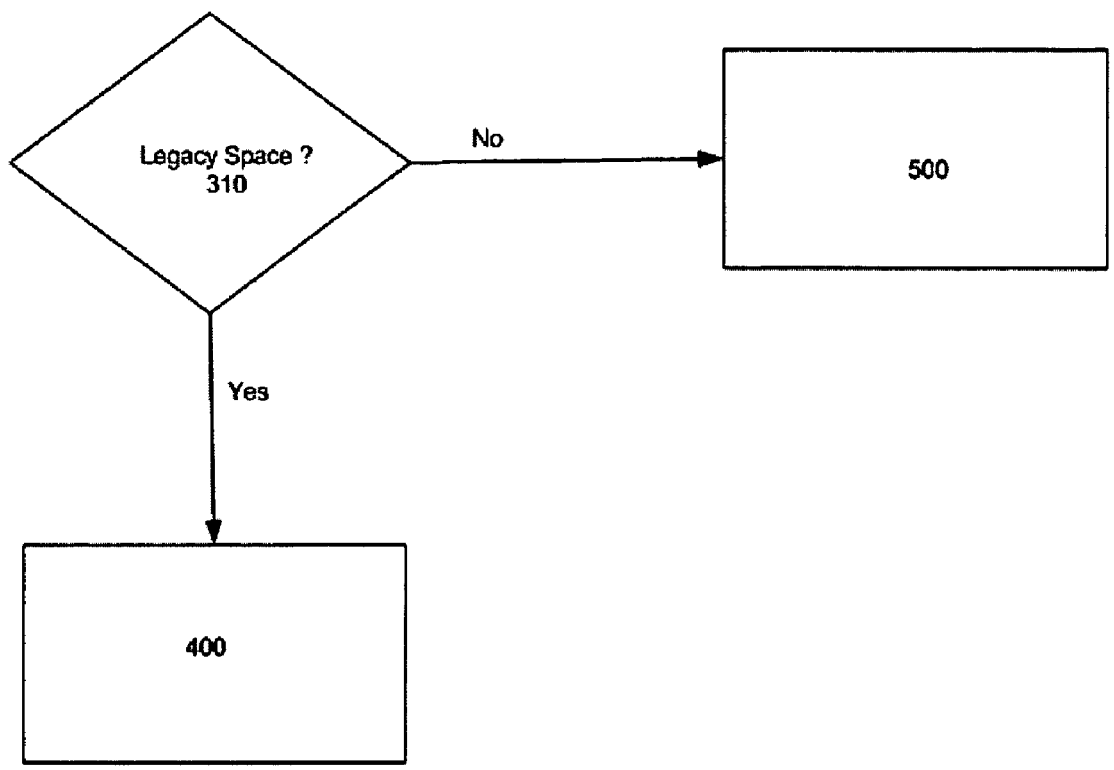
FIG. 3 is a top-level view of a flow diagram of one embodiment of a method for accessing PCI or PCI Express registers.

FIG. 3 is a top-level view of a flow diagram of one embodiment of a method for accessing PCI or PCI Express registers. Although the discussion in connection with FIG. 3 and also FIGS. 4 and 5 below mention PCI and PCI Express implementations, the basic algorithm described can be used in connection with other implementations.

At step 310, a determination is made as to whether a configuration space that is to be accessed is a legacy space (PCI) or not (PCI Express). If the space is a legacy space, then the process moves to block 400, which is discussed in more detail below in connection with FIG. 4. If the space is not a legacy space, then the process moves to block 500, which is discussed in more detail below in connection with FIG. 5.

Figure 4:
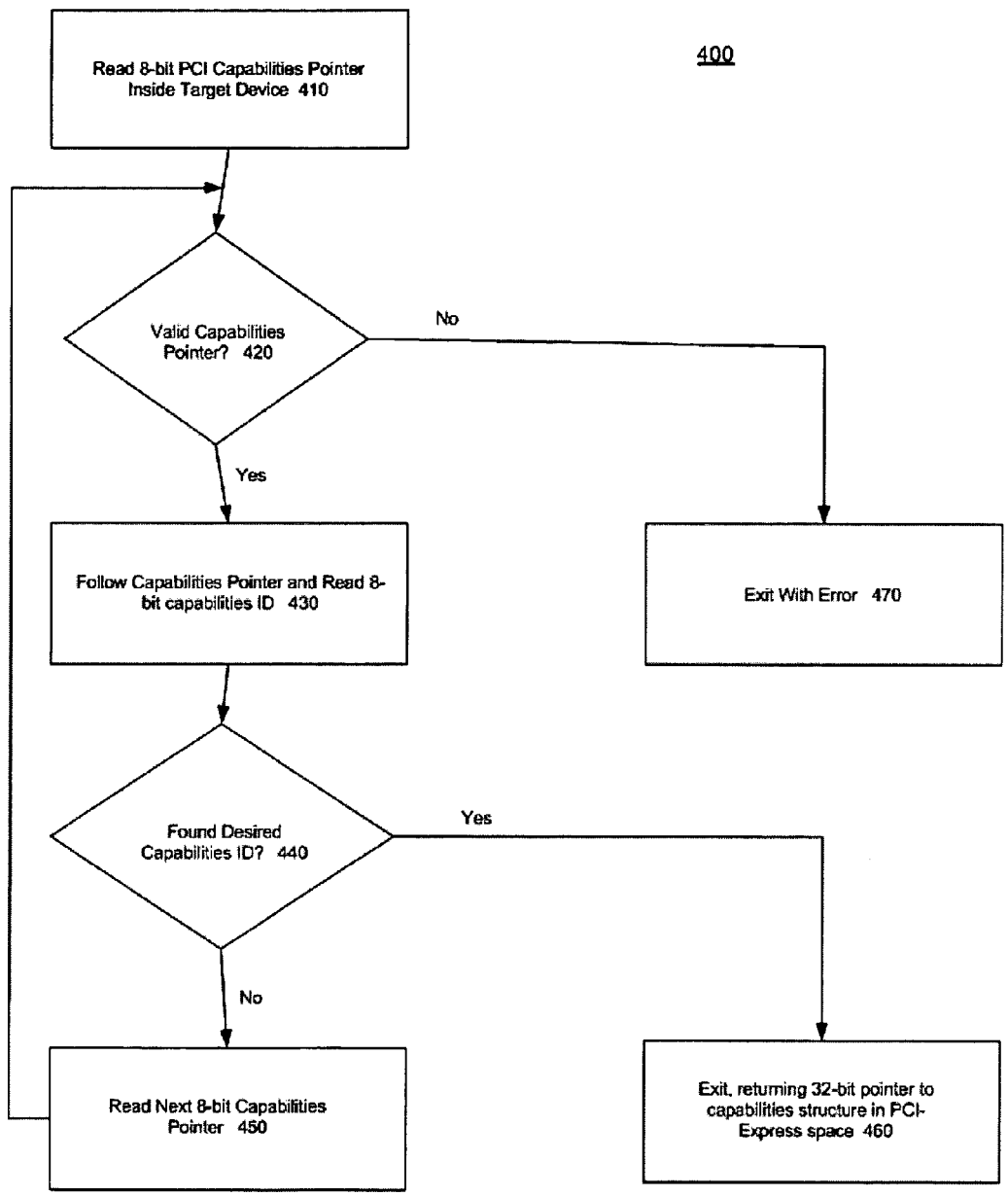
FIG. 4 is a flow diagram of one embodiment of a method for accessing PCI registers.

FIG. 4 is a flow diagram of one embodiment of a method for accessing PCI registers. FIG. 4 corresponds to block 400 from FIG. 3. A scanning process begins at block 410 where an 8-bit PCI capabilities pointer that is located within a target device is read. In general, a PCI capabilities pointer indicates the location of a PCI capabilities identification (ID) register. The capabilities ID register stores a pointer to a structure within the configuration space. With a known capabilities ID value, the associated structure can be found during the scanning process.

At block 420, a determination is made as to whether the previously read capabilities pointer is valid. If the pointer is not valid, then the process exits with an error at block 470. If the pointer is valid the process continues at block 430.

At block 430, an 8 bit capabilities ID register is read from a location indicated by the capabilities pointer. If the capabilities ID value matches the desired capabilities ID, then the process exits at block 460 by returning a pointer to the capabilities structure. Because the starting address of the structure is now known, a register within the structure can be accessed by adding a known offset to the starting address of the structure.

If the read capabilities ID does not match the desired capabilities ID, then a next 8-bit capabilities pointer is read at block 450 and the process returns to block 420. This process is repeated until the desired structure is located and its starting address determined.

Figure 5:
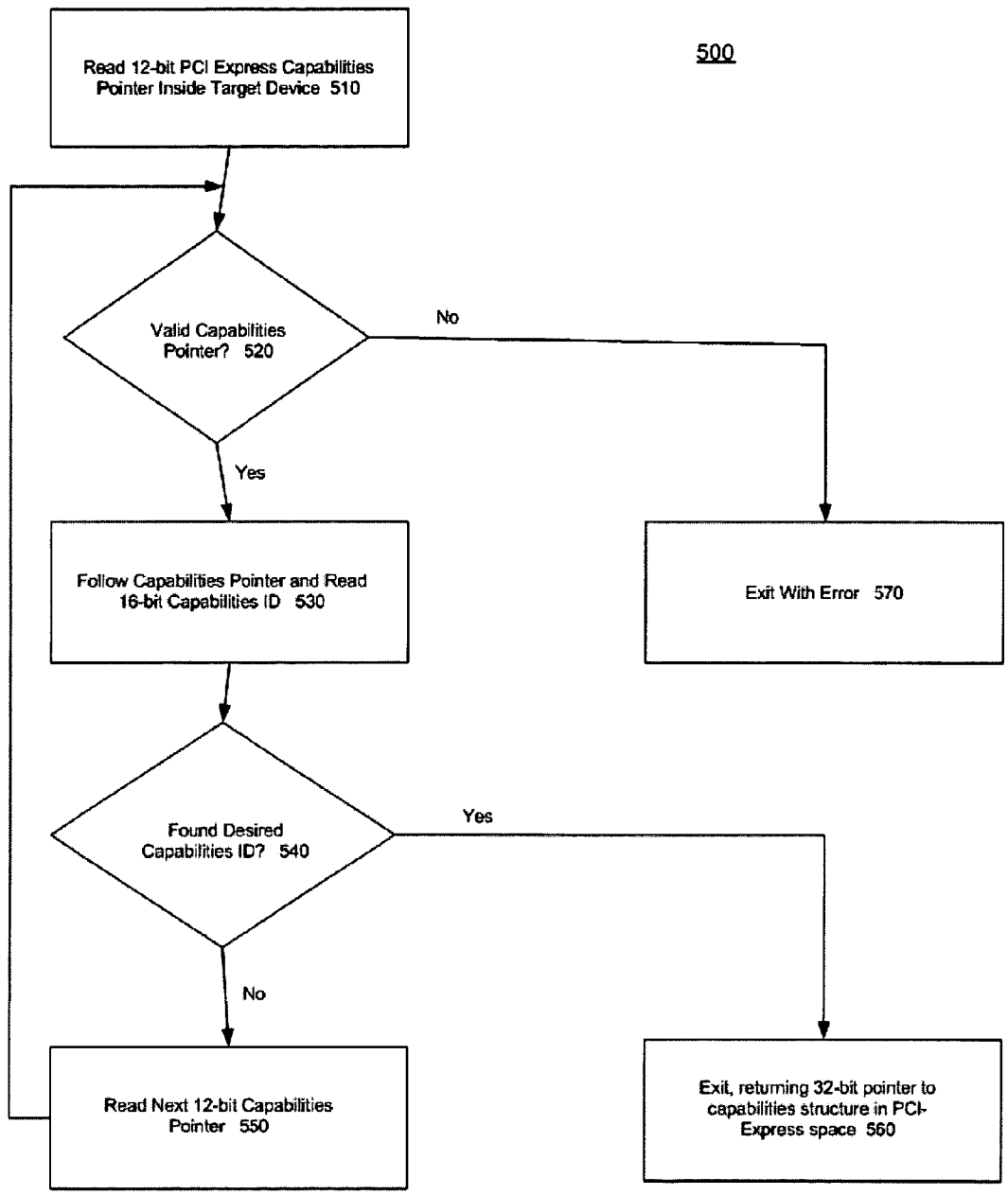
FIG. 5 is a flow diagram of one embodiment of a method for accessing PCI Express registers.

FIG. 5 is a flow diagram of one embodiment of a method for accessing PCI Express registers. FIG. 5 corresponds to block 500 from FIG. 3. A scanning process begins at block 510 where a 12-bit PCI Express capabilities pointer that is located within a target device is read. In general, a PCI Express capabilities pointer indicates the location of a PCI Express capabilities ID register. The capabilities ID register stores a pointer to a structure within the configuration space. With a known capabilities ID value, the associated structure can be found during the scanning process.

At block 520, a determination is made as to whether the previously read capabilities pointer is valid. If the pointer is not valid, then the process exits with an error at block 570. If the pointer is valid the process continues at block 530.

At block 530, a 16-bit capabilities ID register is read from a location indicated by the capabilities pointer. If the capabilities ID value matches the desired capabilities ID, then the process exits at block 560 by returning a 32-bit pointer to the capabilities structure in PCI Express space. Because the starting address of the structure is now known, a register within the structure can be accessed by adding a known offset to the starting address of the structure.

If the previously read capabilities ID does not match the desired capabilities ID, then a next 12-bit capabilities pointer is read at block 550 and the process returns to block 520. This process is repeated until the desired structure is located and its starting address determined.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A method, comprising:
scanning an address space to locate a structure, wherein scanning the address space to locate the structure comprises scanning for an identification register of a device whose value matches a predetermined value, wherein the identification register identifies a starting address location of the structure within the address space, wherein scanning the address space comprises:
reading a first capabilities pointer located inside the device, wherein the first capabilities pointer points to a first identification register having a first identification value; and
reading a second capabilities pointer if the first identification value of the first identification register does not matches the predetermined value;
determining the starting address location of the structure from the identification register whose value matches the predetermined value; and
accessing a register located within the structure by adding a predetermined offset to the starting address location of the structure.

2. The method of claim 1, wherein scanning the address space includes scanning a PCI address space.

3. The method of claim 1, wherein scanning the address space includes scanning a PCI Express address space.

4. The method of claim 1, wherein scanning the address space to locate the structure includes scanning an address space to locate a structure that is located within a configuration space of the device.

5. The method of claim 2, wherein reading the first capabilities pointer comprises reading an 8-bit PCI capabilities pointer located inside the device.

6. The method of claim 5, wherein scanning the address space to locate the structure further includes determining whether the 8-bit PCI capabilities pointer is a valid capabilities pointer.

7. The method of claim 6, wherein scanning the address space to locate the structure further includes following the 8-bit PCI capabilities pointer to read the first identification value, wherein the first identification value is an 8-bit capabilities identification value.

8. The method of claim 7, wherein scanning the address space to locate the structure further includes determining whether the read 8-bit capabilities identification value matches the predetermined value, wherein the predetermined value is a predetermined capabilities identification value.

9. The method of claim 8, wherein reading the second capabilities pointer comprises reading a next 8-bit capabilities pointer if the read 8-bit capabilities identification value does not match the predetermined capabilities identification value.

10. The method of claim 9, wherein determining the starting address location of the structure includes returning a pointer to the structure if the read 8-bit capabilities identification value match value.

11. The method of claim 3, wherein reading the first capabilities pointer comprises reading a 12-bit PCI Express capabilities pointer located inside the device.

12. The method of claim 11, wherein scanning the address space to locate the structure further includes determining whether the 12-bit PCI Express capabilities pointer is a valid capabilities pointer.

13. The method of claim 12, wherein scanning the address space to locate the structure further includes following the 12-bit PCI Express capabilities pointer to read a 16-bit capabilities identification value as the first identification value.

14. The method of claim 13, wherein scanning the address space to locate the structure further includes determining whether the read 16-bit capabilities identification value matches the predetermined value, wherein the predetermined value is a predetermined capabilities identification value.

15. The method of claim 14, wherein reading the second capabilities pointer comprises reading a next 12-bit capabilities pointer if the read 16-bit capabilities identification value does not match the predetermined capabilities identification value.

16. The method of claim 15, wherein determining the starting address location of the structure includes returning a pointer to the structure if the read 16-bit capabilities identification value matches the predetermined capabilities identification value.

17. A machine-readable medium having stored thereon instructions which, when executed by a computer system, causes the computer system to perform a method comprising:
scanning an address space to locate a structure, wherein scanning the address space to locate the structure comprises scanning for an identification register of a device whose value matches a predetermined value, wherein the identification register identifies a starting address location of the structure within the address space, wherein scanning the address space comprises:
reading a first capabilities pointer located inside the device, wherein the first capabilities pointer points to a first identification register having a first identification value; and
reading a second capabilities pointer if the first identification value of the first identification register does not matches the predetermined value;
determining the starting address location of the structure from the identification register whose value matches the predetermined value; and
accessing a register located within the structure by adding a predetermined offset to the starting address location of the structure.

18. The machine-readable medium of claim 17, wherein scanning the address space includes scanning a PCI address space.

19. The machine-readable medium of claim 17, wherein scanning the address space includes scanning a PCI Express address space.

20. The machine-readable medium of claim 17, wherein scanning the address space to locate the structure includes scanning an address space to locate a structure that is located within a configuration space of the device.

21. The machine-readable medium of claim 18, wherein reading the first capabilities pointer comprises reading an 8-bit PCI capabilities pointer located inside the device.

22. The machine-readable medium of claim 21, wherein scanning the address space to locate the structure further includes determining whether the 8-bit PCI capabilities pointer is a valid capabilities pointer.

23. The machine-readable medium of claim 22, wherein scanning the address space to locate the structure further includes following the 8-bit PCI capabilities pointer to read the first identification value, wherein the first identification value is an 8-bit capabilities identification value.

24. The machine-readable medium of claim 23, wherein scanning the address space to locate the structure further includes determining whether the read 8-bit capabilities identification value matches the predetermined value, wherein the predetermined value is a predetermined capabilities identification value.

25. The machine-readable medium of claim 24, reading the second capabilities pointer comprises reading a next 8-bit capabilities pointer if the read 8-bit capabilities identification value does not match the predetermined capabilities identification value.

26. The machine-readable medium of claim 25, wherein determining the starting address location of the structure includes returning a pointer to the structure if the read 8-bit capabilities identification value matches the predetermined capabilities identification value.

27. The machine-readable medium of claim 19, wherein reading the first capabilities pointer comprises reading a 12-bit PCI Express capabilities pointer located inside the device.

28. The machine-readable medium of claim 27, wherein scanning the address space to locate the structure further includes determining whether the 12-bit PCI Express capabilities pointer is a valid capabilities pointer.

29. The machine-readable medium of claim 28, wherein scanning the address space to locate the structure further includes following the 12-bit PCI Express capabilities pointer to read a 16-bit capabilities identification value as the first identification value.

30. The machine-readable medium of claim 29, wherein scanning the address space to locate the structure further includes determining whether the read 16-bit capabilities identification value matches the predetermined value, wherein the predetermined value is a predetermined capabilities identification value.

31. The machine-readable medium of claim 30, wherein reading the second capabilities pointer comprises reading a next 12-bit capabilities pointer if the read 16-bit capabilities identification value does not match the predetermined capabilities identification value.

32. The machine-readable medium of claim 31, wherein determining the starting address location of the structure includes returning a pointer to the structure if the read 16-bit capabilities identification value matches the predetermined capabilities identification value.

\* \* \* \* \*